Jan. 21, 1930. A. C. FISCHER 1,744,714
CONSTRUCTIONAL MATERIAL AND METHOD OF MAKING SAME
Filed April 16, 1928
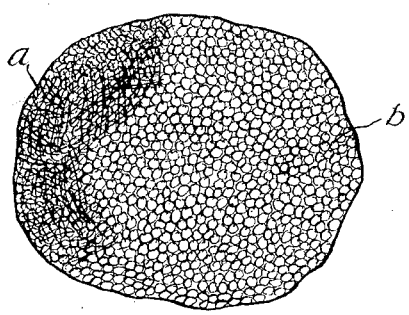
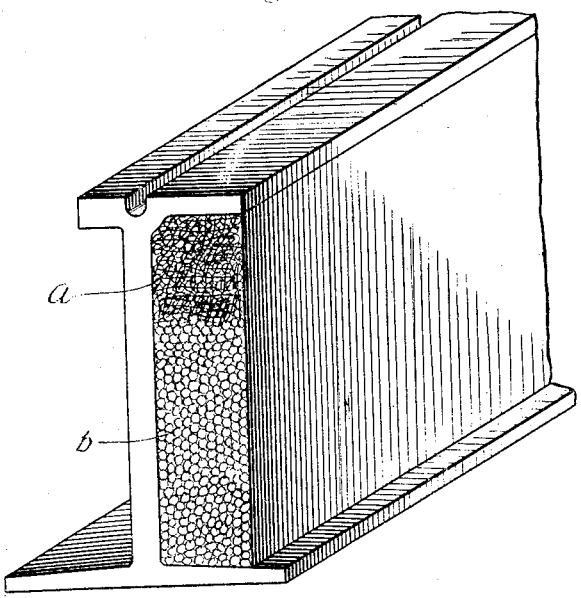

Patented Jan. 21, 1930

1,744,714

UNITED STATES PATENT OFFICE

ALBERT C. FISCHER, OF CHICAGO, ILLINOIS, ASSIGNOR TO THE PHILIP CAREY MANUFACTURING COMPANY, A CORPORATION OF OHIO

CONSTRUCTIONAL MATERIAL AND METHOD OF MAKING SAME

Application filed April 16, 1928. Serial No. 270,518.

This application relates to subject-matter shown and described in my Patent No. 1,591,670, issued July 6, 1926, and particularly pertains to preformed slabs or strips of bituminous material for use in constructional material such as, flooring, paving, expansion strips, protection course for paving, rail crossings, rail fillers and the like.

These slabs or strips are preferably sponge-like or cellular in structure, and may be so formed by incorporating air or an air-pocketing ingredient in a heated mass of bituminous or other plastic material. The air may be directly incorporated into the plastic mass, or indirectly by means of chemical action. Various chemicals, such as bicarbonate of soda, Glauber's salts, sulphur, lime and the like are suitable for effecting the cellular rubber-like character in the mass.

A mass of bituminous matter may be mixed with a fibrous substance to strengthen it, suitably filled or charged with air cells, and while in this condition suddenly chilled or immersed in cold water to permanently retain the cellular sponge-like formation.

Another method by which the air trapping condition may be affected is to prepare a substance to increase its capillary action and then immerce the body in heated bituminous matter, and allowing the body to absorb and draw the heated bituminous matter thru its structure, thereby forming a bituminous wall about its numerous air pockets, and creating a spongy, cellular mass, readily compressed and of a resilient sponge-like character.

It is readily understood that the bituminous substance used may be chemically treated, air blown, fibrated and otherwise treated to secure toughness and rubbery consistency. This would naturally involve many chemicals used in the treatment of rubber, sponge rubber and its preparation for vulcanization, so I do not wish to be limited to the nature, body structure or chemical contents of the asphalt or other bituminous material. Vegetable oils may also enter into such a structure if properly treated, especially for the manufacture of expansion joints. Earthy matter is sometimes used to secure greater stiffness and check the inherent flow tendency and adhesiveness.

This invention relates further to incorporating relatively long, fibers, in which case the bituminous cellular material herein described should preferably be of a very stiff and tough structure and contain considerable earthy matter to prevent adhesion of the cell walls. One good medium thru which the air can be trapped in pockets is by utilizing a matted, laminated, cellular flax structure, or one of hemp, flax and straw, which has been treated with caustic soda, thus removing the gummy matter in the straw, flax or other vegetable fiber, thus increasing its capillary action.

The purpose of incorporating these fibers as a reinforcing means is to strengthen the mass and adapt it for various uses, such as rail filler blocks of various formations, etc.

In the accompanying drawings Figure 1 illustrates a mixture of sponged asphalt and relatively long fibers, $a$ representing the fiber and $b$ the walls of the cells.

Figure 2 shows this mass preformed into a rail filler, $a$ representing the fiber and $b$ the walls of the sells.

Figure 3 shows the mass preformed into a rail filler, contoured to fill the cavity in the side of the rail and extend flush with the bottom side of the rail foot.

Though I have described with particularity of detail certain specific embodiments of the invention, yet it is not to be understood therefrom that the invention is restricted to the particular embodiments disclosed. Various modifications thereof may be made by those skilled in the art without departing from the invention.

I claim:

1. Preformed construction units, comprising a sponge-like cellular structure having fibrous material incorporated throughout the entire structure for reenforcing the cells.

2. Preformed construction units, comprising a homogeneous composition of bituminous compound, an air-pocketing ingredient, and reenforcing elements, said preformed units having an imperforated wall covering.

3. Preformed construction units comprising a sponge-like cellular structure having fibrous material incorporated throughout the entire structure for reenforcing the cells, said preformed units having an imperforate wall covering.

4. A preformed rail filler comprising sponge-like cellular bituminous material having fibers incorporated therewith for reenforcing the cells of said structure.

5. A preformed rail filler consisting of bituminous material, the interior portion of which has a sponge-like structure with interlaced fibers incorporated therein for reenforcing the cells of said structure, and the exterior comprising a solid wall enclosing said interior portion.

6. Preformed rail fillers for flanking the sides of a rail, comprising a homogeneous composition of bituminous compound, an air-pocketing ingredient, and reenforcing elements.

7. Preformed rail fillers for flanking the sides of a rail, comprising a sponge-like cellular structure having fibrous material incorporated throughout for reenforcing the cells.

8. Preformed rail fillers for flanking the sides of a rail, comprising an air-pocketing ingredient, and reenforcing elements, said rail fillers having an imperforate wall covering.

9. Preformed rail fillers for flanking the sides of a rail, comprising a sponge-like cellular structure having fibrous material incorporated throughout for reenforcing the cells, said rail fillers having an imperforate wall covering.

10. A preformed rail filler for flanking the sides of a rail, composed of a homogeneous mixture of bituminous compound, and an air pocketing ingredient, said filler being contoured on one face to conform to the cavity of a rail and flared to extend from the ball flush with the bottom side of the rail foot.

11. A preformed rail filler for flanking the sides of a rail, composed of a homogeneous mixture of bituminous compond, an air pocketing ingredient, and reenforcing elements, said filler being contoured on the face to conform to the cavity of a rail and extend from beneath the ball flush with the bottom side of the rail foot.

12. The method of forming construction units characterized by warming a bituminous compound to a flowable condition, incorporating a filling ingredient in the compound, forming the mixture into strips, and rapidly cooling said strips.

13. The method of forming construction units characterized by warming a bituminous compound to a flowable condition, incorporating a filling ingredient in the compound, forming the mixture into strips, and subjecting the formed strips to a water bath for cooling.

14. The method of forming constructional material characterized by warming bituminous compound to a flowable condition, incorporating an air pocketing ingredient in the compound, forming the mixture into strips, and rapidly cooling said strips.

15. The method of forming constructional material characterized by warming bituminous compound to a flowable condition, incorporating an air pocketing ingredient in the compound, forming the mixture into strips and subjecting the formed strips to a water bath for cooling.

16. The method of forming constructional material characterized by warming bituminous compound to a flowable condition, incorporating air pocketing and reenforcing elements in the compound, forming the mixture into strips, and rapidly cooling said strips.

17. The method of forming constructional material characterized by warming bituminous compound to a flowable condition, incorporating air-pocketing and reenforcing elements in the compound, forming the mixture into strips and subjecting the formed strips to a water bath for cooling.

18. Preformed constructional units comprising a homogeneous composition of bituminous compound, an air pocketing ingredient and reenforcing elements.

19. The method of forming constructional material characterized by warming a plastic composition to a flowable condition, incorporating an ingredient in the composition to effect a sponge-like structure, forming the mixture into strips, and cooling the strips.

20. Preformed construction units, comprising a homogeneous composition of bituminous compound and an air pocketing ingredient.

21. Preformed construction units, comprising a homogeneous of bituminous compound and an air pocketing ingredient, said preformed units having an imperforate wall covering.

Signed at Chicago, Illinois, this 22nd day of March 1928.

ALBERT C. FISCHER.